United States Patent [19]

Woodley et al.

[11] Patent Number: 4,645,136
[45] Date of Patent: Feb. 24, 1987

[54] TAKEUP SPINDLE

[75] Inventors: George M. Woodley, Shrewsbury; Albert H. Wilson, Marlboro, both of Mass.

[73] Assignee: King Instrument Corporation, Westboro, Mass.

[21] Appl. No.: 765,854

[22] Filed: Aug. 14, 1985

Related U.S. Application Data

[63] Continuation of Ser. No. 626,534, Jun. 29, 1984, abandoned.

[51] Int. Cl.$^4$ ............................................. B65H 75/24
[52] U.S. Cl. .................................. 242/68.3; 242/72 R
[58] Field of Search ..................... 242/68.3, 68.2, 68.1, 242/72 R, 129.71

[56] References Cited

U.S. PATENT DOCUMENTS

| 2,254,605 | 9/1941 | Foster | 242/68.3 |
| 2,576,254 | 11/1951 | Fletcher | 242/72 R |
| 3,252,667 | 5/1966 | Miller | 242/68.3 X |
| 3,840,193 | 10/1974 | Feichtinger et al. | 242/68.3 |
| 3,999,721 | 12/1976 | Dufresne | 242/68.3 |

Primary Examiner—John M. Jillions
Attorney, Agent, or Firm—Schiller & Pandiscio

[57] ABSTRACT

An improved takeup spindle for automatic cassette loading machines is provided. The takeup spindle comprises a shaft having at least a pair of slots therein, a pair of dogs in the slots, means pivotally connecting the dogs to the shaft, and ring means establishing an outer limit position for the dogs.

1 Claim, 7 Drawing Figures

TAKEUP SPINDLE

PRIOR APPLICATION

This is a continuation of U.S. patent application Ser. No. 626,534, filed June 29, 1984 now abandoned.

This invention relates to automatic cassette loading machines and more particularly to an improvement in the takeup spindles employed in such machines.

PRIOR ART

U.S. Pat. No. 4,061,286 illustrates a machine for automatically loading empty cassettes one at a time with magnetic tape. Each empty cassette contains a pair of hubs and a leader tape connected to the two hubs. The machine includes: (1) a magazine for holding a supply of empty cassettes, (2) means for holding an empty cassette in a selected loading position below the magazine, (3) means for withdrawing the leader from an empty cassette located at the loading position and positioning the withdrawn leader on a splicing block assembly, (4) means for sequentially (a) severing the leader into first and second sections, (b) splicing the first leader section to the leading end of a supply tape, (c) winding a selected length of said supply tape into the cassette, (d) severing the supply tape, (e) splicing the trailing end of the supply tape to the second leader section, and (f) winding the trailing end of the severed length of supply tape and the second leader section into the cassette, (5) means for discharging a loaded cassette from the loading position and feeding another empty cassette to the loading position from the magazine, and (6) means for sequentially and cyclically activating the forgoing means so that successive cassettes in the magazine are automatically loaded and discharged from the magazine.

In a machine of the type described in the foregoing patent, the winding of tape into an empty cassette is accomplished by engaging one of the hubs of the cassette with a takeup spindle (see element 192 in U.S. Pat. No. 4,061,286). The takeup spindle is attached to and driven by a motor (air or electric) which is located behind the front panel. The takeup motor is mounted for reciprocation toward and away from the front panel of the machine, so that the spindle can be moved into and out of engagement with one of the hubs of a cassette disposed in loading position.

Other machines for automatically loading empty cassettes are disclosed in U.S. Pat. Nos. 4,062,719, 4,332,355, 4,264,402, 3,940,080, and the prior publications cited in those patents.

The form of the takeup spindle is an important consideration in the design of an automatic cassette loading machine. It is essential that the spindle be able to (a) quickly and positively engage the hub of a cassette in position to be loaded, and (b) be quickly disengaged from that hub as the takeup motor is moved rearwardly away from the front panel of the machine. For this purpose, the takeup spindle is provided with means for interlocking with teeth on the inner peripheral surfaces of one or the other of the two hubs of the cassette to be loaded. Provision of teeth on cassette hubs so that hubs may be driven by a complementary spindle is standard practice in the art as shown, for example, by U.S. Pat. Nos. 3,637,153 and 3,814,343.

In prior machines problems have occurred in connection with the ability of the takeup spindle to drive a hub of a cassette to be loaded. A primary problem is the reliability of the takeup spindle to rapidly and reliably engage and be disengaged from the teeth on a cassette hub as the machine is repetitively cycled. A further problem with prior art takeup spindles is that they have been unsatisfactory because of high cost of manufacture.

OBJECTS AND SUMMARY OF THE INVENTION

The primary object of this invention is to provide a new and improved takeup spindle for an automatic cassette loading machine of the kind described in U.S. Pat. No. 4,061,286.

A further object of this invention is to provide a takeup spindle having an improved combination of means for engaging the teeth of a cassette hub, whereby the spindle is adapted to accurately and positively engage with the teeth of the cassette hub.

These and other objects of the invention are achieved by providing a takeup spindle which comprises a shaft having at least a pair of slots therein, a pair of dogs in the slots, means pivotally connecting the dogs to the shaft, spring means causing the dogs be pivoted to an outer limit position, and ring means establishing the outer limit position for the dogs.

Other features and many of the attendant advantages and objects of the invention are set forth in the following detailed description which is to be considered together with the accompanying drawings.

THE DRAWINGS

DETAILED DESCRIPTION OF THE PREFERRED EMBODIMENT OF THE INVENTION

Figure 1:
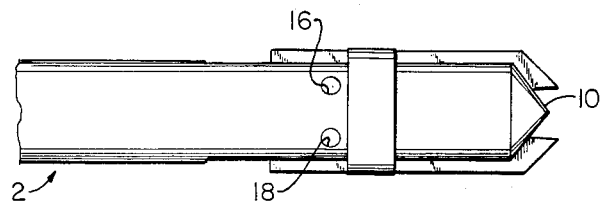
FIG. 1 is a fragmentary side elevation of a takeup spindle embodying the present invention.
Figure 2:
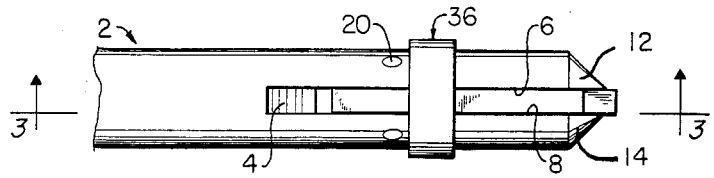
FIG. 2 is a plan view of the same takeup spindle.

Referring now to FIGS. 1 and 2, there is illustrated a takeup spindle 2 which is adapted to be coupled to the output shaft of a reversible takeup motor (not shown). The spindle 2 is characterized by a diametrically extending slot 4 at its front end which is defined by opposite side surfaces 6 and 8 (FIG. 2) and may be formed typically by milling the shaft at its forward end. Prior to formation of the slot 4, the forward end of shaft 2 has a frusto-conical end surface 10 (FIG. 1). Accordingly, when the slot 4 is formed, the forward end of shaft 2 is transformed into two identical frustoconically-tapered forward end sections (FIG. 2).

Figure 3:
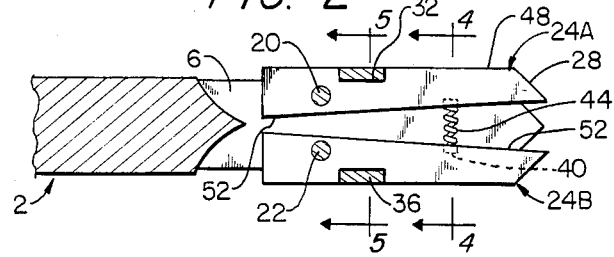
FIG. 3 is a sectional view taken along line 3—3 of FIG. 2.
Figure 4:
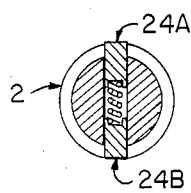
FIG. 4 is a cross-sectional view taken along line 4—4 of FIG. 3.
Figure 5:
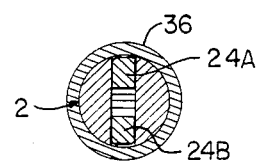
FIG. 5 is a cross-sectional view taken along line 5—5 in FIG. 3.
Figure 7:
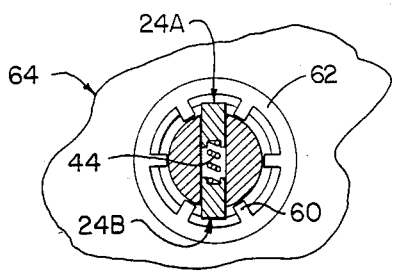
FIG. 7 is a fragmentary view taken from the substantially the same vantage point as FIG. 4 showing how the dogs of the spindle interlock with the hub of a magnetic tape cassette.

Referring now to FIGS. 1-3, two parallel, transversely extending holes 16 and 18 are drilled in the forward end of the takeup spindle eccentric to its longitudinal axis, for the purpose of accomodating pivot pins 20 and 22. The latter make a press fit in holes 16 and 18.

Mounted within slot 4 are two dogs identified generally as 24A and 24B. Dogs 24A and 24B are identical, each having flat opposite sides surfaces and having a thickness dimensioned so that it makes a close but smooth sliding fit in slot 4. The forward end of each dog is provided with an inclined surface 28.

Each dog also is formed with a hole sized to rotatably accept one of the pivot pins 20 and 22. Additionally, each dog is provided with a slot 32 of rectangular configuration. The slots 32 are disposed in identical positions and are sized so as to readily accept a circumferentially-extending retaining ring 36. The retaining ring 36 has a rectangular cross section and is dimensioned so as to make a close yet free fit in the slots 32 and 34.

Each dog also is provided with a blind hole 40, extending at an angle of 90 degrees to holes 16 and 18, for the purpose of accepting the opposite ends of a compression spring 44. Compression spring 44 extends between the two dogs in slot 4 and serves to keep the two dogs separated from one another in tight engagement with retaining ring 36, as shown in FIG. 3. Retaining ring 36 is dimensioned so that it can reside fully in slots 32 so long as the dogs are free to be kept separated by spring 44, and at such time the flat outer surfaces 48 of the two dogs will extend parallel to the axis of spindle 2, as shown in FIG. 1. The inner surfaces 52 of the dogs extend at an angle to their outer surfaces 48. Hence when the two dogs are separated by spring 44 against ring 36, the inner surfaces 52 will extend at an inclined angle to the axis of the spindle. The length of the dogs is such that (a) their inclined surfaces 28 will be parallel or nearly parallel to portions of the frusto-conically shaped end surfaces of the spindle when the two dogs are fully engaged with ring 36, and (b) the junction of their inclined end surfaces 28 with their inner surfaces 52 is slightly forward of the pointed end of the spindle.

Figure 6:
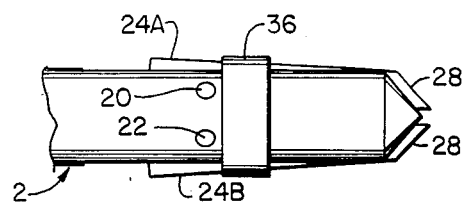
FIG. 6 is a view like FIG. 1 showing the dogs in compressed position.

The inclined surfaces 28 of the two dogs function to facilitate insertion of the dogs and the spindle into the center aperture of a hub of a cassette to be loaded. The thickness of the two dogs i.e., the dimension of the dogs extending between the side surfaces 6 and 8 of slot 4, is such as to permit the dogs to fit between adjacent teeth 60 of the hub 62 of a cassette 64 to be loaded. The diameter of spindle 2 is made smaller than the diameter of the center aperture of the cassette hub defined by the inner ends or tips of teeth 60, so as to allow it to be quickly and easily inserted and withdrawn from the cassette hub. The pivot pins 20 and 22 are positioned and the dogs are dimensioned so that when their outside surfaces 48 are parallel to the axis of the spindle, the distance between the two surfaces 48 is slightly less than the diameter of the center aperture of the cassette hub measured at the base of teeth 60. The dogs also are dimensioned so that they can be compressed toward one another far enough (see FIG. 6) so that at a short distance forward of ring 36, the outer surfaces 48 of the dogs determine a diameter which is less than the diameter of the center aperture of the cassette hub measured at the tips of teeth 60. The thickness of ring 36 and the depths of slots 32 are arranged so that the ring 36 cannot come free from the dogs when the dogs are cammed inwardly by engagement with the teeth of a cassette hub.

The foregoing design is arranged so that as the takeup spindle is thrust forward against the hub of a cassette to be loaded, the dogs will be in the position shown in FIGS. 1 and 3. Assuming that the two dogs are aligned with gaps between adjacent teeth 60 when the spindle is thrust forward, the two dogs will readily fit between adjacent teeth 60 of the hub, thereby interlocking with the teeth so that the hub will rotate with the spindle when the latter is driven by the takeup motor. Spring 44 keeps the two dogs away from one another, so as to maintain them interlocked with the teeth of the hub of the cassette as the spindle is rotated under the driving force of the takeup motor. It is to be noted that when the spindle is thrust forward to engage a cassette hub, the dogs may be aligned with two diametrically opposed teeth 60. In such case the inclined front surfaces 28 of the dogs will engage the two diametrically opposed teeth and cause the dogs to be cammed inwardly enough to allow the spindle to penetrate the hub without interlocking with the teeth. Spring 44 may press the dogs against the tips of the aligned teeth with sufficient force to cause the hub to rotate with the spindle. In any event, at the start of a tape winding operation, the dogs will move out of alignment with the two diametrically opposed teeth and, as they do, spring 44 will cause the two dogs to spring apart into the gaps between those teeth and successive teeth, thereby causing the dogs to interlock in a positive fashion with the teeth of the hub.

After a cassette has been loaded with a suitable amount of magnetic tape, the spindle will readily withdraw from engagement with the cassette hub on rearward movement of the takeup motor away from the loaded cassette, permitting the latter to be released from the machine. When the spindle is withdrawn, the two dogs will readily move away from one another under the influence of spring 44.

The foregoing construction is believed to offer the advantages of simplicity and reduced cost of manufacture. The pivot holes formed in the dogs are sized so as to permit the dogs to move easily into and out of engagment with retaining ring 36 under the influence of uniform spring 44, thereby facilitating a rapid cassete loading cycle. At the same time the slots 32 have a depth which is sufficient to as to cause the retaining ring to remain engaged with the two dogs even when the two dogs are forced toward one another when engaging the teeth of the hub of a cassette to be loaded. Moreover, the inner surfaces 52 may be arranged so that their angle relative to outer surfaces 48 is sufficient to allow a mechanic to move the two dogs toward one another far enough to permit the ring 36 to be removed for replacement or inspection of the dogs or spring 44 without first removing pivot pins 20 and 22.

Other advantages of the invention will be obvious to persons skilled in the art.

Clearly the invention is susceptible of a number of modifications obvious to persons skilled in the art. Therefore, the invention is to be construed only in accordance with the terms of the following claims.

What is claimed is:

1. A takeup spindle for a cassette-loading machine comprising:
   a shaft having a front end and a rear end, said front end terminating in a conically tapered front end surface;
   a slot in the front end of said shaft, said slot extending diametrically through said front end of said shaft and said front end surface;
   first and second dogs in said slot, said dogs having opposite first and second ends with said second ends being closer to said rear end than said first ends, said first ends extending forwardly of said front end surface, said first ends having leading edge surfaces disposed at an acute angle to the rotational axis of said shaft, said leading edge surfaces extending in converging relation to one another said first and second dogs having surface edges which are substantially straight from the second ends thereof to said leading edge surfaces;

pivot means pivotally securing said dogs to said shaft, said pivot means being located closer to said second ends than said first ends;

dog-limiting means for limiting pivotal movement of said first and second dogs relative to said shaft, said dog-limiting means comprising a ring surrounding said shaft and said dogs between said pivot means and said first ends of said dogs; and spring means extending between said dogs for urging said dogs into tight engagement with said ring, said spring means comprising a compression spring disposed in blind holes in said dogs.

* * * * *